May 21, 1940.    L. STARK    2,201,930
SELF-LOCKING BOLT FOR AUTOMOBILE LICENSE PLATES
Filed Jan. 4, 1938
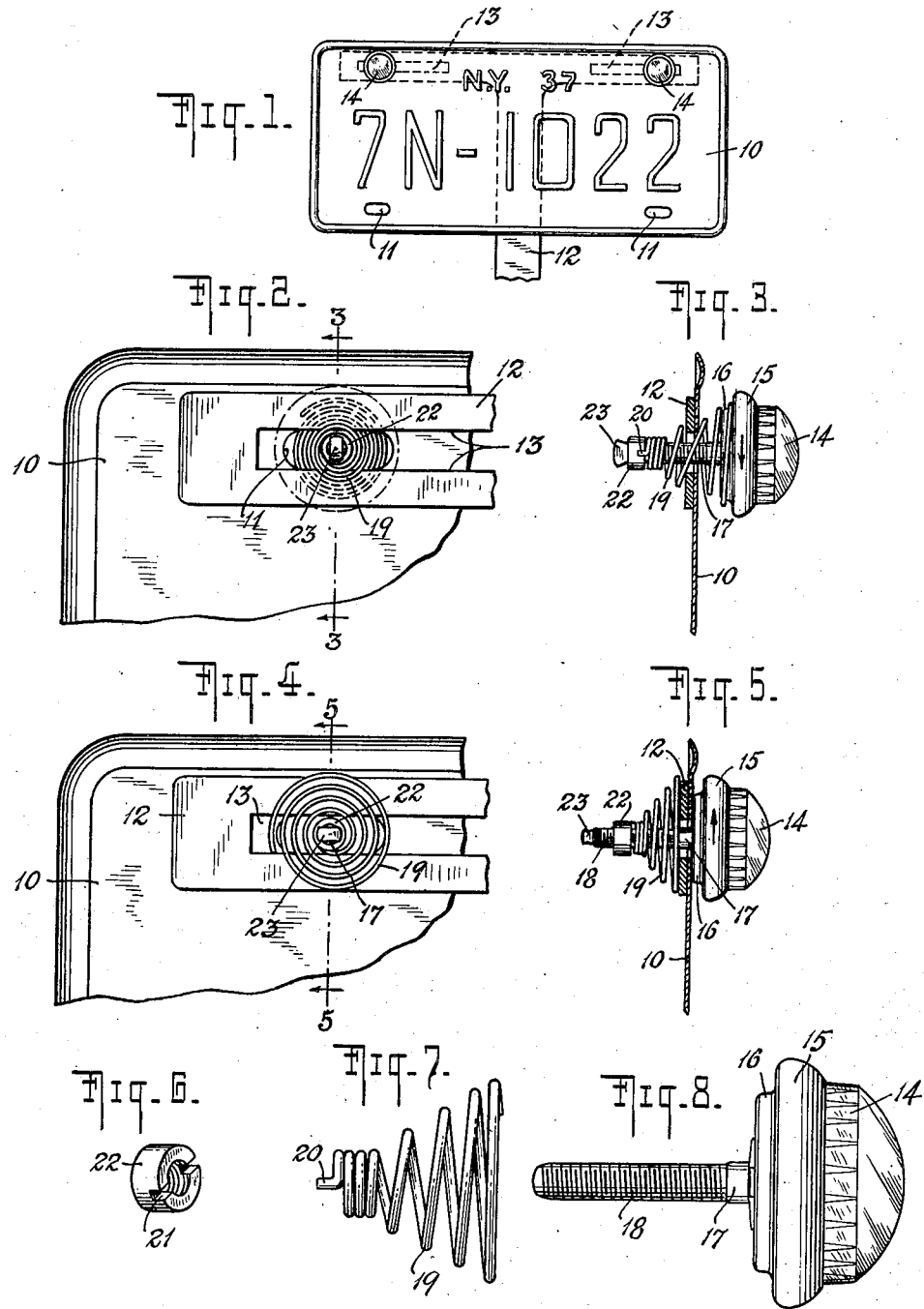
INVENTOR
LOUIS STARK
BY
Lackenbach & Hirschman
ATTORNEYS Patented May 21, 1940

2,201,930

UNITED STATES PATENT OFFICE 2,201,930

SELF-LOCKING BOLT FOR AUTOMOBILE LICENSE PLATES

Louis Stark, Brooklyn, N. Y., assignor to Kastar, Incorporated, a corporation of New York Application January 4, 1938, Serial No. 183,255

1 Claim. (Cl. 151—24)

The invention relates to a mounting for a reflector jewel adapted to be secured to the license plate of an automotive vehicle, and through such license plate to the bracket supporting the plate. More particularly, the invention relates to a jewel mount which is so constructed as to be self-locking; i. e., when the jewel has been applied to the license plate and the bracket thereof by revolving the jewel and its casing in one direction, a firm and rigid positioning of the jewel and its casing upon the front surface of the license plate is attained, whereupon, by rotating the jewel and its casing in the opposite direction, the structure becomes permanently secured, by means of the self-locking feature with which the jewel is provided, so that it becomes impossible thereafter to remove the jewel from the license plate except by destroying the jewel and its associated mechanical parts.

I am aware that supposedly self-locking jewel structures of the general type indicated, have heretofore appeared upon the market, the locking mechanism of which is constituted of a tapered, convoluted spring secured at its small diameter end near the extremity of a bolt extending from the jewel casing, with the larger free end of the spring being adapted to abut against the rear surface of the casing. Upon the insertion of the free end of the rod into the aperture of a license plate, and upon rotation of the jewel and its casing clockwise, the jewel and the casing is adapted to be brought into abutting relation with the front surface of the license plate by the passage of the convolutions of the spring through the license plate aperture.

Such a construction, however, is characterized by the absence of any fixed and rigid pressure of the rear face of the casing of the jewel against the surface of the license plate, and is generally unsatisfactory as not being capable of yielding a tight, rigid, and fixed, mounting of the jewel, so that in the course of the continued vibration attendant the operation of the motor vehicle, the jewel and its mounting rattles and is otherwise incapable of giving a satisfactory rigid mounting thereof upon the license plate.

In accordance with my invention, I utilize a similarly tapered, convoluted spring made of tool steel and secure the small diameter end of the spring within a transversely extending slot of a nut mounted for rotation upon threads of the bolt extending from the jewel casing. In accordance with my inventive structure, the jewel and its mounting, in their application to a license plate and its bracket, are first passed through the apertures of such license plate and bracket, and then rotated counterclockwise until substantially the entire convoluted spring has passed through the apertures, so that the rear surface of the jewel casing abuts against the front surface of the license plate. Thereupon, the jewel casing is rotated in the opposite direction, i. e., clockwise, causing the nut upon the threaded bolt extending from the jewel casing, to move, by its threaded engagement with the bolt, along such bolt, until the entire convoluted spring assumes. upon continued rotation of the jewel casing in a clockwise direction, a substantially flat, annular disposition, or such disposition thereof as is sufficient to securely lock the jewel and its casing against the front surface of the license plate, thereby making it substantially impossible to remove the same by rotation thereof, from the license plate and its bracket.

A specific embodiment of my invention is illustrated in the accompanying drawing, in which Fig. 1 is a front view of an automobile license plate and of the bracket supporting the same, showing the application of two jewel mounts thereto in accordance with my invention; Fig. 2 is a rear view of a corner of the license plate, a portion of the supporting bracket, and of the jewel and its mounting in the course of application to the license plate and bracket; Fig. 3 is a section on the line 3—3 of Fig. 2; Fig.. 4 is a rear view similar to Fig. 2, showing the convolute spring in its final jewel-locking position; Fig. 5 is a section on the line 5—5 of Fig. 4; and Figs. 6, 7 and 8 show the three parts of the jewel mounting structure separated from each other.

Referring more particularly to the drawing, in which similar reference characters identify similar parts in the several views, 10 is a license plate having the conventional elongated slots 11. The license plate is adapted to be secured by means of my novel reflector jewel mounting structure to a bracket 12 having elongated slots 13 therein.

My novel jewel and mounting structure therefor, comprises a reflecting body 14 of any conventional configuration, faceting or convex reflecting surface, secured within a casing 15 having a depressed cup-like projection 16. Secured to the center of the rear face of the casing member constituted of the parts 15 and 16 in any conventional manner and extending rearwardly therefrom, is a bolt 17 provided with threading 18. Extending about the bolt is a tapering, convoluted spring 19, the larger diameter end of which abuts against the surface of the jewel casing. The smaller diameter end of the spring is formed with a projecting lug 20 which is adapted to enter and to be secured within a slot 21 cut in the face of an interiorly-threaded nut 22. Such nut is applied to the end of the bolt 17 by the engagement of the interior threads thereof with the threading 18 of such bolt.

For convenience in fabrication, the nut 22 has its slot 21 extending substantially transversely thereof, although it will be understood that only one portion of such slot, namely, that within which the end 20 of the spring is secured, is necessary.

After the spring 19 and the nut 22 have been secured upon the bolt 17, the material at the free end of such bolt is compressed so as to give the extremity of such bolt a configuration in which it is flat on two sides and the material thereof is pressed outwardly to constitute a stop 23 for the nut 22.

In the application of my novel structure to the license plate and bracket, the operation is the following:

The end of the bolt 17 and the nut 22 thereon are passed from the front of the license plate through the aperture 11 of such plate and through the aperture 13 of the bracket, the reduced diameter end of the spring 19 likewise passing through such apertures. The casing of the jewel is then rotated in a counter-clockwise direction, (as shown in Fig. 3) causing the convolutions of the spring to pass through the apertures of the license plate and bracket until substantially all of the spring has passed through such apertures and the jewel casing is substantially flush with the front surface of the license plate.

After this operation has been completed, the jewel and its casing are turned in the opposite direction, i. e., clockwise, (as shown in Fig. 5) causing the nut 22 to move along, by its threaded engagement with the threaded bolt 17, causing a compression of the convolutions of the spring until such spring is brought to a condition in which it firmly and securely locks the jewel and its casing against further rotation. Rotation of the spring 19 and, therefore, of the jewel and its casing, in one direction after such locking has been effected, is prevented by the engagement of the free end of the spring against the side of the bracket forming the edge of the slot 13, and in the opposite direction by the abutment of the nut 22 against the flattened spring.

A substantially rigid and complete locking of the jewel and its mounting against rotation and, therefore, preventing a removal thereof except by destruction of the entire structure, is thus effected.

While I have described a specific embodiment of my invention, it is obvious that various changes in the construction and configuration of the component parts thereof, may be made without departing from my invention. For instance, any other means of securing the end of the tapered spring 19 to the nut 20 than by a slot, as 21, may be used, as a sleeve disposed upon such nut to which sleeve the reduced end of the spring may be secured.

I claim:

A self-locking mounting structure for automobile license plates, comprising a threaded bolt, a slotted nut secured upon such threaded bolt for movement therealong, and a spring having convolutions tapering in diameter toward said nut and disposed about said bolt with the small diameter end thereof having a projecting lug for anchoring the end of the spring to said nut.

LOUIS STARK.